No. 717,235. Patented Dec. 30, 1902.
G. W. MARBLE.
FRICTION POWER TRANSMITTING MECHANISM.
(Application filed May 12, 1902.)
(No Model.) 2 Sheets—Sheet 2.
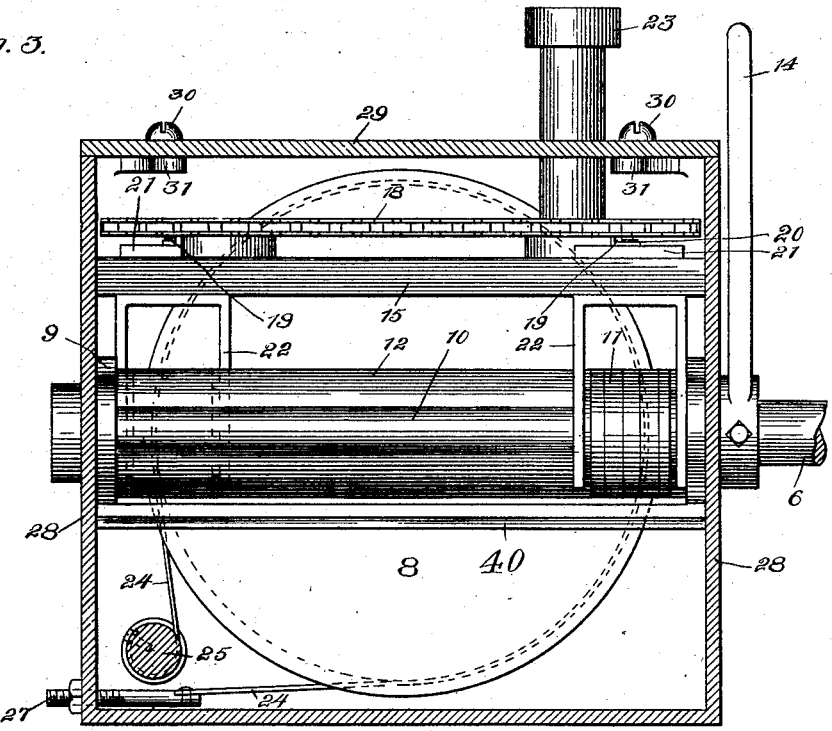
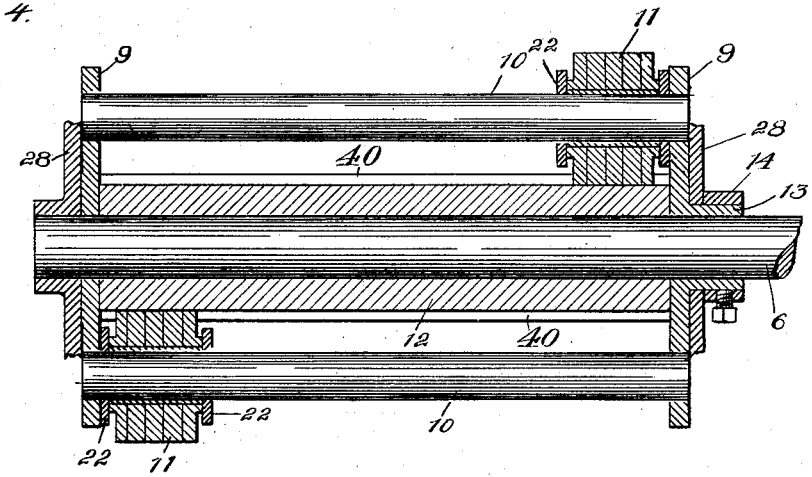
Witnesses:
Wm. Geiger
H. M. Munday
Inventor:
George W. Marble
By Munday, Evarts & Adcock,
Attorneys

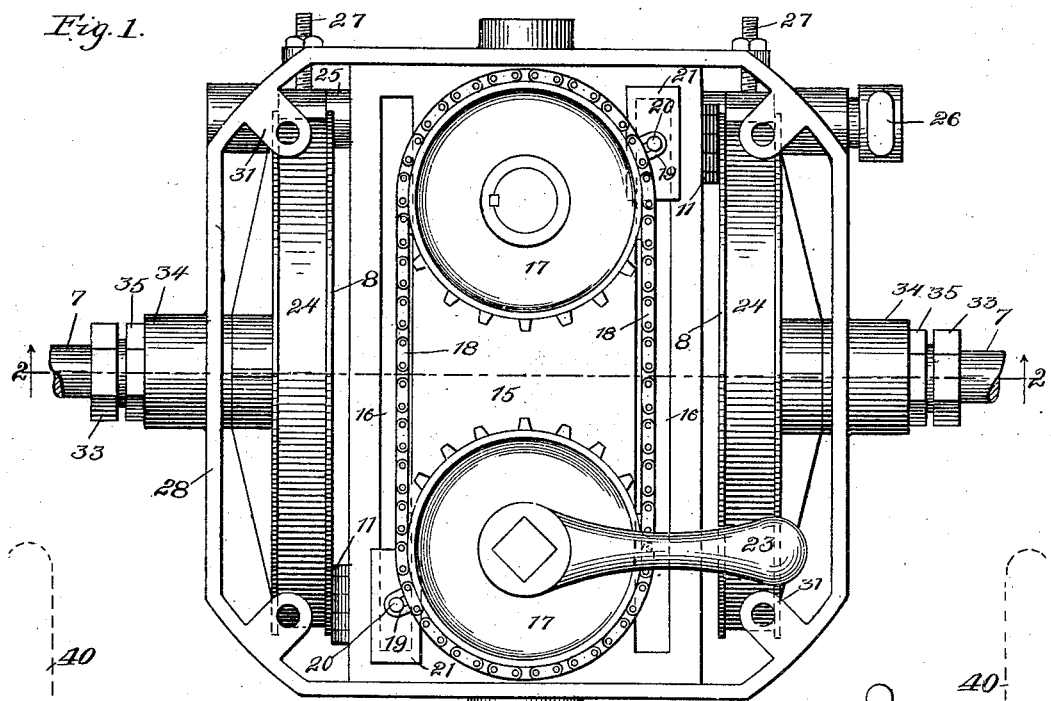

UNITED STATES PATENT OFFICE.

GEORGE W. MARBLE, OF BUCHANAN, MICHIGAN, ASSIGNOR, BY MESNE ASSIGNMENTS, TO THE MARBLE-SWIFT AUTOMOBILE COMPANY.

FRICTION POWER-TRANSMITTING MECHANISM.

SPECIFICATION forming part of Letters Patent No. 717,235, dated December 30, 1902.

Application filed May 12, 1902. Serial No. 106,882. (No model.)

*To all whom it may concern:*

Be it known that I, GEORGE W. MARBLE, a citizen of the United States, residing in Buchanan, in the county of Berrien and State of Michigan, have invented a new and useful Improvement in Friction Power-Transmitting Mechanism, of which the following is a specification.

This invention has been devised more especially for use in automobiles, and relates to the mechanism for transmitting power from a constantly-operating engine to the wheels. The mechanism is capable of stopping, starting, and backing the wheels and of varying the speed to any extent desired within the maximum allowed by the motor employed.

It also embodies a simple and efficient brake by which the driven wheels are controlled.

My object in the invention has been to devise a very compact, inexpensive, and efficient construction of transmitting-gear and also one which can be wholly inclosed, so as to be dust, dirt, and moisture proof.

In my invention I employ a friction-disk for each driven wheel and arrange the driving-shaft at right angles to said disks and between them. Upon the driving-shaft is mounted a rocking frame consisting of cross-heads and longitudinal members at each end of the cross-heads, the longitudinal members each supporting a friction-roller driven by the shaft and which by the rocking of the frame is brought into contact with one of the disks. The two friction-rollers are adjustable on the supporting members so that they can be made to act on the disks at different distances from the centers thereof or be moved from one side to the other of such centers, the adjustment to different distances effecting variations in the speed and the adjustment to different sides effecting changes in the direction. The stopping and starting are caused by rocking the frame so as to carry the friction-rollers out of or into contact with the disks. I also embody with the transmitting-gear a brake mechanism acting on the disks and inclose the same in a tight box, whereby all dust, dirt, and moisture are excluded.

These and further details of my invention will be fully understood from the description given below and from the accompanying drawings, in which latter—

Figure 1 is a plan of my invention. Fig. 2 is a section on the line 2 2 of Fig. 1. Fig. 3 is a section on the line 3 3 of Fig. 2. Fig. 4 is a detail horizontal section of the rocking frame.

In said drawings, 6 represents a shaft, which is driven by any suitable motor and which may be kept in constant motion while the automobile is in use. From this driving-shaft my invention transmits power to the shafts 7 7, which may be the axles of the wheels of the vehicle or be geared to such axles in any known way. I have indicated traction-wheels 40 upon said axles by broken lines in Fig. 2. On the ends of the shafts 7 7 are friction-disks 8 8, with their flat faces toward each other. The drive-shaft is arranged between and at right angles to the shafts 7 and with its axis in the same plane with the axis of the shaft 7. On the shaft are loosely mounted the cross-heads 9 9 of the rocking frame, and these heads are united by round longitudinal bars 10 10, secured in the ends of the heads, one at each side of the drive-shaft. These bars serve as shafts to the friction-rollers 11, of which there is one on each bar. The rollers turn freely on the bars and may also be slid thereon whenever the speed of the machine is to be varied or its direction changed, and they are brought into operative contact with the disks and carried out of such contact by rocking the frame 9 10 whenever the vehicle is to be started, stopped, or backed. The drive-shaft carries a sleeve 12 between the cross-heads, which is of sufficient diameter to enable it to bear against the friction-rollers, and being fast on the shaft it is adapted to actuate the rollers in whatever position the latter may be adjusted.

It will be seen from the description so far given that if the rocking frame is turned so as to carry the rollers against the disks the latter will be rotated by power from the drive-shaft. For the purpose of imparting these rocking movements to the frame one of the cross-heads is provided with a hub 13, upon which a lever 14 is secured, as plainly shown at Figs. 3 and 4.

As already stated, the friction-rollers 11 are adjustable on the bars 10, so that they may be moved toward or away from or from one side to the other of the centers of the disks with which they are in contact to vary the speed or change the direction. These sliding movements are imparted as follows: At 15 is a slotted plate, the slots being indicated at 16. Upon this plate are journaled two sprocket-wheels 17 17, carrying an endless chain 18, from which project two slotted ears 19 19. These ears each receive an upstanding pin 20, secured in a slide 21. The slides traverse the slots 16, already mentioned, and each of them supports a shifter 22. This shifter consists of two arms sitting down, one at each side of its corresponding roller, the arms being slotted, as particularly shown at Fig. 2, to enable them to straddle the rods 10 and also to permit the rocking of the roller-frame, the slots being curved for this purpose. The sprocket-wheels 17 17 are controlled by any suitable lever—as, for instance, that shown at 23—and when actuated by the lever they cause such movement of the chain as will carry the slides 21 in the required direction and to the required distance to effect the changes in speed or direction. To move the rollers from the periphery of the disks to the center or to any intermediate point requires but a quarter-turn, or thereabout, of the wheels 17; but if the rollers are to be carried from the periphery at one side of the disks to the corresponding position at the other side of their centers the sprocket-wheel should be given a half-turn, or thereabout.

A brake is also combined with my improved transmitting-gear, consisting of bands 24, one encircling each of the disks 8, and a device whereby the bands may be tightened. This tightening device may consist of a wind-up roll 25, actuated by the lever 26, the bands being secured at one end to this roll and at the other end to adjusting-bolts 27. The peripheries of the disks are preferably provided with flanges, between which the brake-band will be confined.

All the parts thus far described, except the levers through which the parts are controlled, may be and preferably are inclosed in a box 28, having a removable cover 29, held in place by screws 30 entering the ears 31 on the inside of the body of the box. Of course this box must be provided with openings to receive the shafts 6 and the axles 7; but it closely encircles those parts and is adapted to exclude dust, dirt, and moisture from the friction devices and other parts within the same, and as the parts are arranged very compactly the box may be made correspondingly small.

For the purpose of withstanding the end thrust upon the friction-disks, caused by the pressure of the friction-rollers upon the disks, I employ a series of balls 32 and a sleeve 33, threaded into the bearing 34 of the shafts 7. This sleeve can be adjusted in or out, as occasion requires, to cause the proper contact between the rollers and disks, and a jam-nut 35 encircles it and holds it against rotation.

It will be noticed from the construction described that in starting and at other times when the maximum of power is desired with a slow speed the friction-rollers can be positioned as in Fig. 1—that is, with the rollers bearing against the peripheral portions of the disks—and that when a greater speed is desired the rollers may be shifted by moving the lever 23, so as to carry the rollers toward the centers of the disks.

The friction-gearing shown is exceedingly simple and powerful. The lever 14, by which the rocking frame is controlled, will be constantly under the control of the hand or foot of the driver, and that is necessary in order to keep the friction devices in contact, because the rollers tend to roll out of contact with the disks, and thus relieve themselves from the pressure, and with this construction the rollers will automatically move out of action as soon as the driver releases his control. This is an important feature, as it insures a cutting off of the power whenever the driver through carelessness or fright or other cause releases the lever and prevents all danger of the auto running wild.

It is desirable that the rocking frame be rigid, and to insure this I prefer to secure a wide strong brace 40 to the cross-heads.

I claim—

1. The combination with the opposite friction-disks and the drive-shaft, of friction-rollers driven by the shaft and bearing each against one of the disks, and supporting means for positioning said rollers against the disks, substantially as specified.

2. The combination with the opposite friction-disks and the drive-shaft, of friction-rollers driven by the shaft, and a frame mounted on the shaft and supporting said rollers and also carrying them into and out of contact with the disks, substantially as specified.

3. The combination with the opposite friction-disks and the drive-shaft, of friction-rollers driven by the shaft and bearing each against one of the disks, and means for shifting said rollers so they will contact with different portions of the disks, substantially as specified.

4. The combination with the opposite friction-disks and the drive-shaft, of friction-rollers supported from and driven by the shaft and bearing each against one of the disks, and means for positioning the rollers against the disks, substantially as specified.

5. The combination with the opposite friction-disks and the drive-shaft, of friction-rollers supported from and driven by the shaft and bearing each against one of the disks, means for positioning the rollers against the disks, and means for shifting the rollers, substantially as specified.

6. The combination with the opposite friction-disks and the drive-shaft, of friction-rollers driven by the shaft, a rocking frame supporting said rollers and carrying them against the disks, and means for shifting the rollers in the frame, substantially as specified.

7. The combination with the opposite friction-disks, of the drive-shaft arranged at right angles to the axes of the disks, friction-rollers driving the disks and receiving power from the shaft, and a rocking frame carrying said rollers into and out of action, substantially as specified.

8. The combination with the opposite friction-disks, of the drive-shaft arranged at right angles to the axes of the disks, and between them, friction-rollers driving the disks and receiving power from the shaft, and a rocking frame carrying said rollers into and out of action, substantially as specified.

9. The combination with the opposite friction-disks and the drive-shaft arranged between the disks, of friction-rollers driven by the shaft and bearing one against each disk, a frame supporting and positioning said rollers relative to the disks, and means for controlling said frame, substantially as specified.

10. The combination with the drive-shaft, of transmitting-gear consisting of friction-disks, and friction-rollers actuated by the shaft and movable into and out of contact with said disks and also adjustable to different positions relative to the centers of the disks, substantially as specified.

11. The combination of the drive-shaft, of transmitting-gear consisting of friction-disks, friction-rollers one for each disk, and means for carrying said rollers into contact with the disks, said rollers receiving power from the shaft, substantially as specified.

12. The combination with the friction-disks and their shafts, of a drive-shaft arranged at right angles to said friction-disk shafts, friction-rollers for actuating said disks, a support for said rollers mounted on the drive-shaft and adapted to maintain them in driving contact with the shaft and to carry them simultaneously and at will one against each disk, and an operative connection between the drive-shaft and the rollers, substantially as specified.

13. The combination with the drive-shaft and friction-disks, of a rocking frame supported on the shaft, friction-rollers for actuating the disks carried by said frame, means whereby the shaft actuates the rollers, and shifting mechanism for shifting said rollers at will, substantially as specified.

14. The combination with the drive-shaft and friction-disks, of a rocking frame supported on the shaft, friction-rollers for actuating the disks carried by said frame, means whereby the shaft actuates the rollers, and shifting mechanism for shifting both said rollers simultaneously at will, substantially as specified.

15. The combination with the drive-shaft and friction-disks, of a rocking frame supported on the shaft, friction-rollers for actuating the disks carried by said frame, means whereby the shaft actuates the rollers, and shifting mechanism for shifting said rollers in opposite directions at will, substantially as specified.

16. The combination with the drive-shaft and the opposite friction-disks, of a rocking frame between the disks, driven friction-rollers for driving the disks mounted on said frame and acting on the disks at opposite sides of their centers, means whereby the shaft actuates the rollers, and a lever for keeping the frame in position to cause the rollers to act, substantially as specified.

17. The combination with the drive-shaft and the opposite friction-disks, of a rocking frame between the disks, driven friction-rollers for driving the disks mounted on said frame and acting on the disks at opposite sides of their centers, means whereby the shaft actuates the rollers, and a lever for keeping the frame in position to cause the rollers to act, the rollers acting automatically to end their contact with the disks when said lever is released, substantially as specified.

18. In an automobile, a friction power-transmitting gear having a driving member and a driven member arranged at right angles to each other and one of them being movable toward and away from the other, and a manually-operated lever for maintaining contact between the parts of the gear, the parts being adapted to separate automatically when the lever is released, substantially as specified.

19. In an automobile, a friction power-transmitting gear consisting of friction-disks, friction-rollers for actuating said disks, and means for moving said rollers into contact with the disks and maintaining said contact, said rollers and disks being adapted to separate automatically, substantially as specified.

20. The combination of the friction-disks and their shafts, and means for adjusting the latter, with the driven friction-rollers actuating said disks, the supporting-frame carrying said rollers, means whereby the drive-shaft actuates the rollers and the drive-shaft, substantially as specified.

21. The combination of separate axles 7, 7 adapted to support traction-wheels on their outer ends, friction-disks on the inner ends of the axles, and driven devices located between and creating friction on said disks and adjustable relative to the same, substantially as specified.

22. The combination of separate axles 7, 7 adapted to support traction-wheels on their outer ends, friction-disks on the inner ends of the axles, a power-shaft between said disks, and friction-rollers driven by the shaft and adapted to actuate the disks, substantially as specified.

GEORGE W. MARBLE.

Witnesses:
H. M. MUNDAY,
L. LINDAUER.